United States Patent
Zhuang

(10) Patent No.: US 9,342,712 B2
(45) Date of Patent: May 17, 2016

(54) METHOD AND SYSTEM FOR ACCELERATING CRYPTOGRAPHIC PROCESSING

(71) Applicant: Advanced Micro Devices, Inc., Sunnyvale, CA (US)

(72) Inventor: Gongyuan Zhuang, Austin, TX (US)

(73) Assignee: ADVANCED MICRO DEVICES, INC., Sunnyvale, CA (US)

(*) Notice: Subject to any disclaimer, the term of this patent is extended or adjusted under 35 U.S.C. 154(b) by 92 days.

(21) Appl. No.: 13/910,476

(22) Filed: Jun. 5, 2013

(65) Prior Publication Data

US 2013/0332744 A1    Dec. 12, 2013

Related U.S. Application Data

(60) Provisional application No. 61/657,400, filed on Jun. 8, 2012.

(51) Int. Cl.
*G06F 21/72* (2013.01)
*G09C 1/00* (2006.01)
*H04L 9/06* (2006.01)
*H04L 9/30* (2006.01)

(52) U.S. Cl.
CPC ........ *G06F 21/72* (2013.01); *G09C 1/00* (2013.01); *H04L 9/0631* (2013.01); *H04L 9/0637* (2013.01); *H04L 9/0643* (2013.01); *H04L 9/3066* (2013.01); *H04L 2209/125* (2013.01)

(58) Field of Classification Search
CPC ............ H04L 2209/125; H04L 9/0637; H04L 9/0631; H04L 9/0643; H04L 9/3066; G06F 21/72; G09C 1/00
See application file for complete search history.

(56) References Cited

U.S. PATENT DOCUMENTS

| | | | | |
|---|---|---|---|---|
| 5,613,005 A * | 3/1997 | Murakami | ............... | H04L 9/12 380/243 |
| 6,272,221 B1 * | 8/2001 | Tsunoo | ........................... | 380/28 |
| 6,658,569 B1 * | 12/2003 | Patarin | .................... | G06F 7/723 713/155 |
| 6,889,320 B1 * | 5/2005 | Davis et al. | ................... | 712/233 |
| 6,973,187 B2 * | 12/2005 | Gligor | ................. | H04L 9/0637 380/28 |
| 7,600,122 B2 * | 10/2009 | Tardo et al. | .................... | 713/171 |
| 7,991,162 B2 * | 8/2011 | Longa | ..................... | G06F 7/725 380/280 |
| 8,036,377 B1 * | 10/2011 | Poo et al. | ........................ | 380/28 |
| 2001/0021253 A1 * | 9/2001 | Furuya | ................. | H04L 9/0625 380/259 |
| 2002/0131592 A1 * | 9/2002 | Hinnant | ............... | H04L 9/0662 380/46 |

(Continued)

OTHER PUBLICATIONS (ACM Snapshot).*

(Continued)

*Primary Examiner* — Michael Pyzocha
(74) *Attorney, Agent, or Firm* — Volpe and Koenig, P.C.

(57) ABSTRACT

A method, an apparatus, and a non-transitory computer readable medium for accelerating cryptographic processing are presented. A cryptographic algorithm is parallelized, which includes breaking the cryptographic algorithm into components, parallelizing an entire component if the component is fully parallelizable, parallelizing part of a component if the component is partially parallelizable, and sequentially executing a component if the component is not parallelizable. Processing of the parallelizable component or the partially parallelizable component is distributed to one or more parallelized devices. The parallelized devices include at least one of: a graphics processing unit or a cryptographic processing device, which may include an integrated cryptographic processor or a cryptographic co-processor.

22 Claims, 3 Drawing Sheets

(56) References Cited

U.S. PATENT DOCUMENTS

| | | | |
|---|---|---|---|
| 2002/0178207 A1* | 11/2002 | McNeil | 709/102 |
| 2003/0142818 A1* | 7/2003 | Raghunathan | G06F 21/72 380/1 |
| 2007/0055875 A1* | 3/2007 | Tardo et al. | 713/169 |
| 2007/0083574 A1* | 4/2007 | Garin et al. | 707/204 |
| 2008/0046756 A1* | 2/2008 | Dempski et al. | 713/187 |
| 2008/0147945 A1* | 6/2008 | Zimmer | G06F 9/4812 710/260 |
| 2008/0195847 A1* | 8/2008 | Wu et al. | 712/216 |
| 2008/0292101 A1* | 11/2008 | Macchi | H04L 63/0428 380/270 |
| 2009/0327818 A1* | 12/2009 | Kogelnik | 714/49 |
| 2010/0306553 A1* | 12/2010 | Poletti, III | 713/189 |
| 2011/0067014 A1* | 3/2011 | Song | G06F 8/456 717/149 |
| 2012/0159194 A1* | 6/2012 | Anderson | H04L 9/002 713/190 |
| 2012/0167097 A1* | 6/2012 | Condorelli | G06F 9/46 718/101 |
| 2012/0180030 A1* | 7/2012 | Crutchfield et al. | 717/149 |
| 2012/0254888 A1* | 10/2012 | Kalogeropulos | G06F 8/452 718/107 |
| 2013/0151787 A1* | 6/2013 | Riguer et al. | 711/137 |

OTHER PUBLICATIONS (IEEE Snapshot).*

Bielecki, W Włodzimierz odzimierz et al., "Parallelization Method of Encryption Algorithms", Advances in Information Processing and Protection, (c) 2007, pp. 191-204.*

* cited by examiner

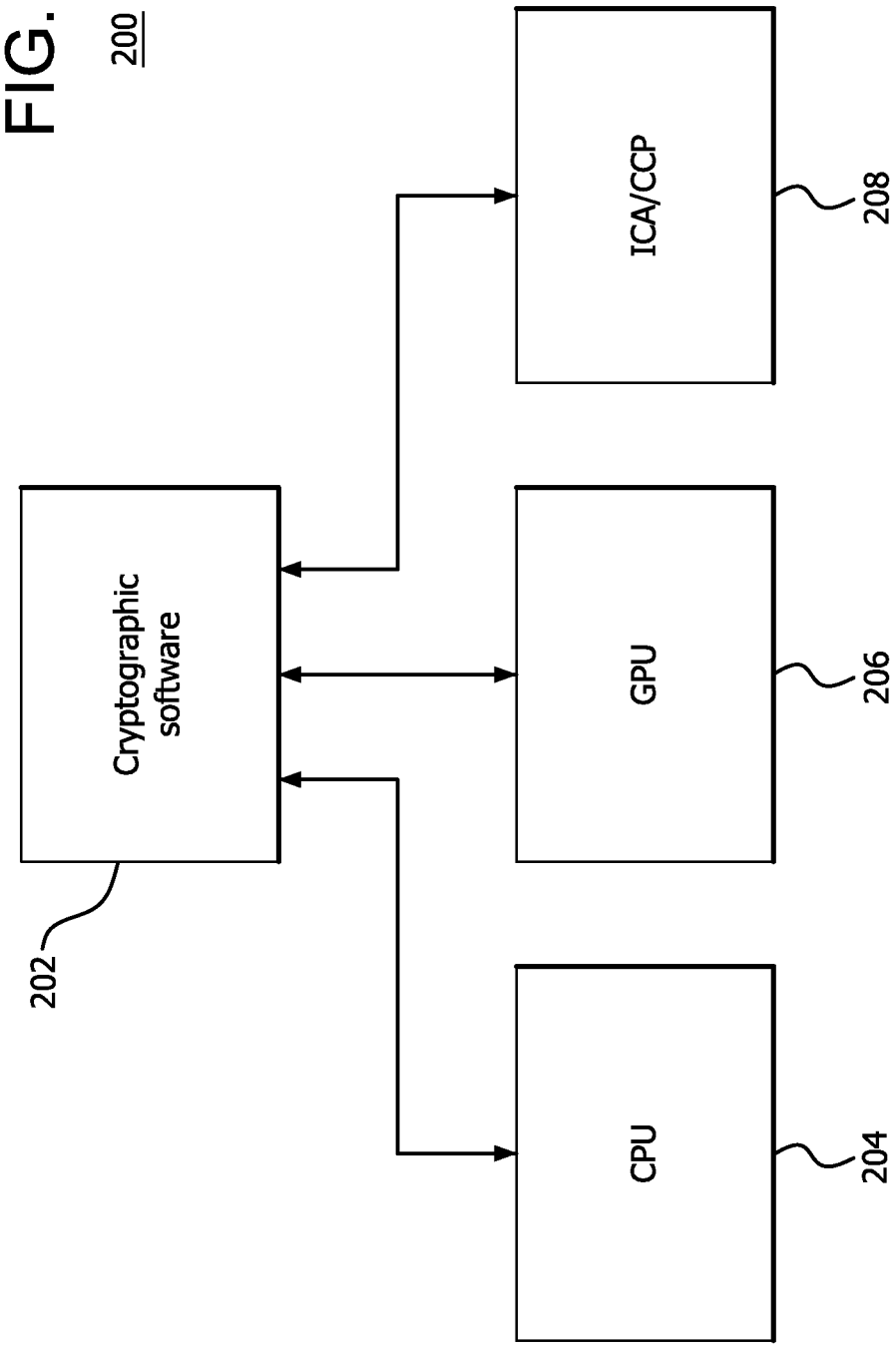

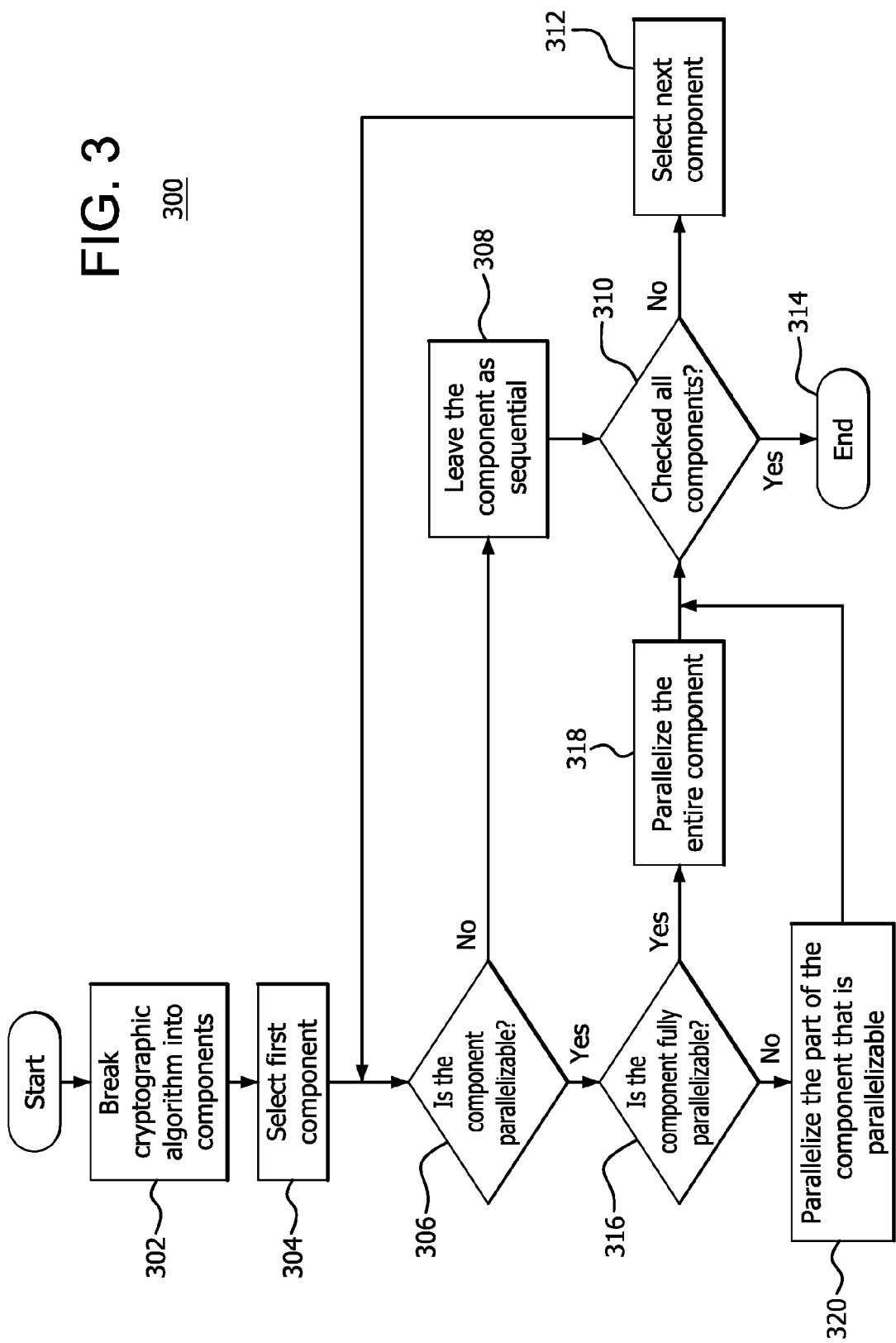

METHOD AND SYSTEM FOR ACCELERATING CRYPTOGRAPHIC PROCESSING

CROSS REFERENCE TO RELATED APPLICATIONS

This application claims the benefit of U.S. Provisional Application No. 61/657,400, filed on Jun. 8, 2012, which is incorporated by reference as if fully set forth herein.

TECHNICAL FIELD

The disclosed embodiments are generally directed to cryptography, and in particular, to methods and systems for accelerating cryptographic processing.

BACKGROUND

Cryptographic algorithms are computationally intensive and are typically implemented in software running on a central processing unit (CPU) core. This computational intensity has the potential to impact overall system performance, battery life, and end-user experience on modern platforms. It is desirable to address these issues, while maintaining an end goal of information security.

SUMMARY OF EMBODIMENTS

Some embodiments provide a method for accelerating cryptographic processing. A cryptographic algorithm is parallelized, which includes breaking the cryptographic algorithm into components, parallelizing an entire component if the component is fully parallelizable, parallelizing part of a component if the component is partially parallelizable, and sequentially executing a component if the component is not parallelizable. Processing of the parallelizable component or the partially parallelizable component is distributed to one or more parallelized devices.

Some embodiments provide a system for accelerating cryptographic processing. The system includes one or more parallelized devices and a central processing unit core. The central processing unit core is configured to parallelize a cryptographic algorithm, including break the cryptographic algorithm into components, parallelize an entire component if the component is fully parallelizable, parallelize part of a component if the component is partially parallelizable, and sequentially execute a component if the component is not parallelizable. The central processing unit core is further configured to distribute processing of the parallelizable component or the partially parallelizable component to the one or more parallelized devices.

Some embodiments provide a non-transitory computer-readable storage medium storing a set of instructions for execution by a general purpose computer to accelerate cryptographic processing. The set of instructions includes a first parallelizing code segment for parallelizing a cryptographic algorithm. The first parallelizing code segment includes a breaking code segment for breaking the cryptographic algorithm into components, a second parallelizing code segment for parallelizing an entire component if the component is fully parallelizable, a third parallelizing code segment for parallelizing part of a component if the component is partially parallelizable, and a sequentially executing code segment for sequentially executing a component if the component is not parallelizable. The set of instructions also includes a distributing code segment for distributing processing of the parallelizable component or the partially parallelizable component to one or more parallelized devices.

BRIEF DESCRIPTION OF THE DRAWINGS

A more detailed understanding may be had from the following description, given by way of example in conjunction with the accompanying drawings, wherein:

FIG. 2 is a block diagram of a portion of a system in which one or more disclosed embodiments may be implemented; and FIG. 3 is a flowchart of a method for parallelizing a cryptographic algorithm.

DETAILED DESCRIPTION

Figure 1:
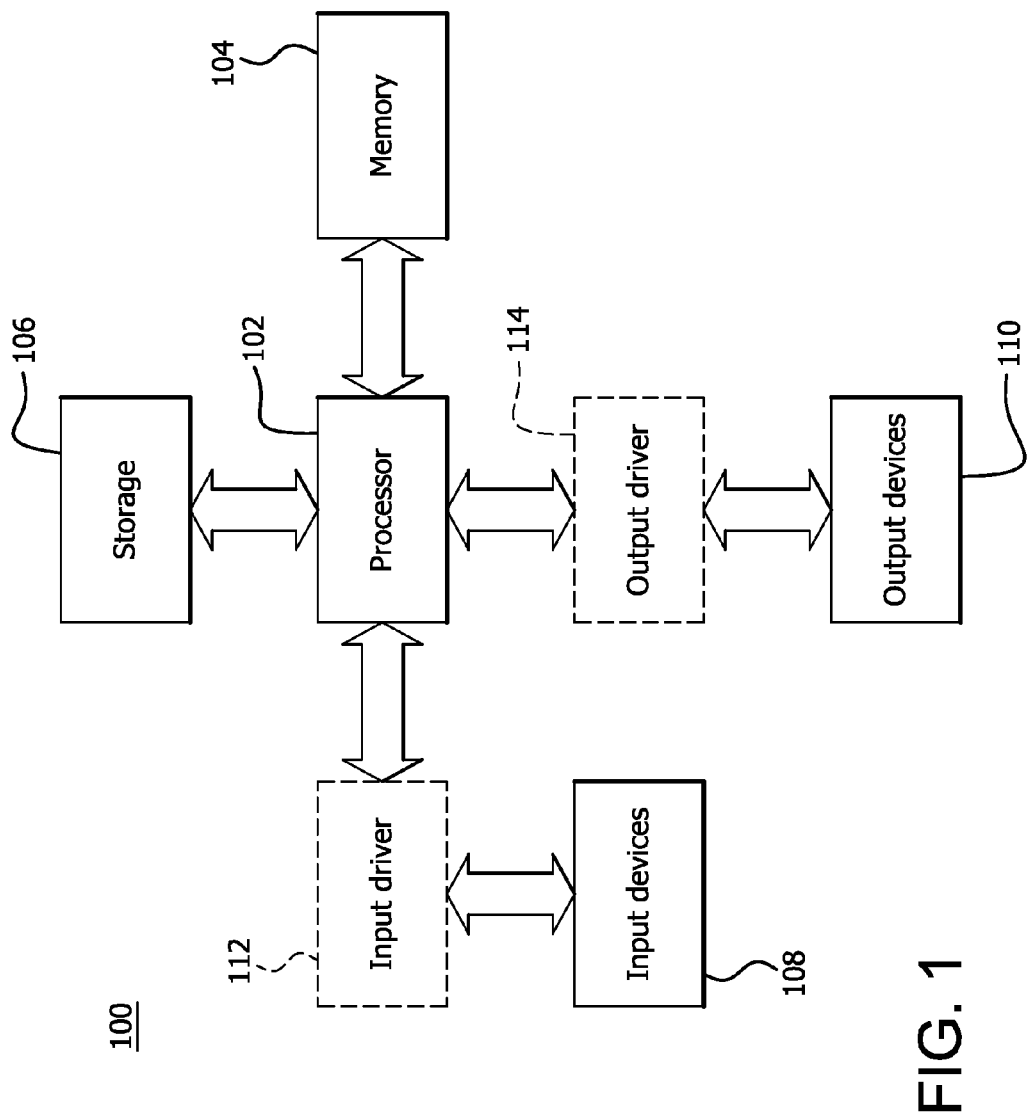
FIG. 1 is a block diagram of an example device in which one or more disclosed embodiments may be implemented.

A method, an apparatus, and a non-transitory computer readable medium for accelerating cryptographic processing are presented. A cryptographic algorithm is parallelized, which includes breaking the cryptographic algorithm into components, parallelizing an entire component if the component is fully parallelizable, parallelizing part of a component if the component is partially parallelizable, and sequentially executing a component if the component is not parallelizable. Processing of the parallelizable component or the partially parallelizable component is distributed to one or more parallelized devices. The parallelized devices include at least one of: a graphics processing unit or a cryptographic processing device, which may include an integrated cryptographic processor or a cryptographic co-processor.

FIG. 1 is a block diagram of an example device 100 in which one or more disclosed embodiments may be implemented. The device 100 may include, for example, a computer, a gaming device, a handheld device, a set-top box, a television, a mobile phone, or a tablet computer. The device 100 includes a processor 102, a memory 104, a storage 106, one or more input devices 108, and one or more output devices 110. The device 100 may also optionally include an input driver 112 and an output driver 114. It is understood that the device 100 may include additional components not shown in FIG. 1.

The processor 102 may include a central processing unit (CPU) core, a graphics processing unit (GPU) core, a CPU core and a GPU core located on the same die, or one or more processor cores, wherein each processor core may be a CPU core or a GPU core. The memory 104 may be located on the same die as the processor 102, or may be located separately from the processor 102. The memory 104 may include a volatile or non-volatile memory, for example, random access memory (RAM), dynamic RAM, or a cache.

The storage 106 may include a fixed or removable storage, for example, a hard disk drive, a solid state drive, an optical disk, or a flash drive. The input devices 108 may include a keyboard, a keypad, a touch screen, a touch pad, a detector, a microphone, an accelerometer, a gyroscope, a biometric scanner, or a network connection (e.g., a wireless local area network card for transmission and/or reception of wireless IEEE 802 signals). The output devices 110 may include a display, a speaker, a printer, a haptic feedback device, one or more lights, an antenna, or a network connection (e.g., a wireless local area network card for transmission and/or reception of wireless IEEE 802 signals).

The input driver 112 communicates with the processor 102 and the input devices 108, and permits the processor 102 to receive input from the input devices 108. The output driver 114 communicates with the processor 102 and the output devices 110, and permits the processor 102 to send output to the output devices 110. It is noted that the input driver 112 and the output driver 114 are optional components, and that the device 100 will operate in the same manner if the input driver 112 and the output driver 114 are not present.

Cryptographic processing performance may be improved by hardware changes, software changes, or a combination of both. Hardware changes may include using faster CPUs; more CPU cores; or a highly parallelized architecture processor such as a dedicated function module, including, for example, an integrated cryptographic accelerator (ICA) or a cryptographic co-processor (CCP). Software changes may include parallel cryptographic processing or distributing portions of the cryptographic processing workload to parallelized devices (which include a highly parallelized processor architecture).

By using a dedicated device for cryptographic processing (either an ICA or a CCP), the processing load may be shifted off of the CPU and onto the dedicated device. Shifting some of the processing load off of the CPU results in lower power consumption by the CPU, makes the CPU available for other tasks (freeing up resources), and may permit the cryptographic processing to be completed faster.

FIG. 2 is a block diagram of a portion of a system 200 in which one or more disclosed embodiments may be implemented. The system 200 includes a cryptographic software component 202, a CPU 204, a GPU 206, and a cryptographic processing device 208, which may include an ICA or a CCP. The CPU 204, the GPU 206, and the cryptographic processing device 208 may all be located on the same die, on different dies, or a combination thereof.

It is noted that the system 200 may be implemented with either the GPU 206 or the cryptographic processing device 208 or both. The cryptographic processing device 208, while possibly including some design similarities to the GPU 206, differs from the GPU 206 in that the cryptographic processing device 208 includes specific cryptographic-related functionality, as described in detail below.

FIG. 3 is a flowchart of a method 300 for parallelizing a cryptographic algorithm. The method 300 is performed in connection with a CPU, a GPU, and/or a cryptographic processing device (ICA or CCP). A cryptographic algorithm is broken into separate components (step 302). The components of a cryptographic algorithm may include individual modules or functions that comprise the cryptographic algorithm. A first component of the cryptographic algorithm is selected (step 304) and a determination is made whether the selected component is parallelizable (step 306). If the selected component is not parallelizable then the selected component is left as sequential (step 308). Next a determination is made whether all of the components of the cryptographic algorithm have been checked (step 310). If all of the components have not been checked, then the next component in the cryptographic algorithm is selected (step 312) and the method 300 continues at step 306 as described above. If all of the components have been checked (step 310), then the method terminates (step 314).

If the selected component of the cryptographic algorithm is parallelizable (step 306), then a determination is made whether the selected component is fully parallelizable (step 316). If the selected component is fully parallelizable, then the entire component is parallelized (step 318). Next a determination is made whether all of the components of the cryptographic algorithm have been checked (step 310). If all of the components have not been checked, then the next component in the cryptographic algorithm is selected (step 312) and the method 300 continues at step 306 as described above. If all of the components have been checked (step 310), then the method terminates (step 314).

If the selected component is not fully parallelizable (step 316), then the part of the selected component that is parallelizable is parallelized (step 320). Next a determination is made whether all of the components of the cryptographic algorithm have been checked (step 310). If all of the components have not been checked, then the next component in the cryptographic algorithm is selected (step 312) and the method 300 continues at step 306 as described above. If all of the components have been checked (step 310), then the method terminates (step 314).

A programmer may indicate whether a component or a part of a component is parallelizable, may indicate a preference for whether the component or part of the component is parallelizable depending on the available hardware, or may leave the determination to the method 300, which would include determining the available hardware at runtime. In addition, it may be possible for the programmer to indicate where (for example, on the GPU or on the ICA or CCP) to perform the parallelizable component or parallelizable part of the component.

One implementation of the method 300 may be based on the Advanced Encryption Standard (AES). It is noted that the description herein of AES is only an example used to further describe the system 200 and the method 300, and that the system 200 and the method 300 are applicable to any cryptographic algorithm. Furthermore, it is noted that the cryptographic processing device 208 may include one or more cryptographic engines, with each cryptographic engine being specific to a particular cryptographic algorithm, such that a different cryptographic engine (or multiple cryptographic engines) would be needed in the cryptographic processing device 208 depending on the cryptographic algorithm(s) being performed therein. Alternatively, the cryptographic processing device 208 may include a single cryptographic engine, such that a different cryptographic processing device 208 would be needed in the system 200 depending on the cryptographic algorithm being performed therein.

The AES algorithm uses a symmetric key block cipher algorithm to provide an information service, such as confidentiality or authentication. AES has a fixed block size of 128 bits and a key size of 128, 192, or 256 bits. Some CPUs may include AES-specific instructions in their instruction sets. Portions of the AES algorithm that are fully parallelizable include the electronic codebook(ECB) and counter (CTR) portions. Portions of the AES algorithm that are partially parallelizable include cipher-block chaining(CBC) and cipher feedback (CFB), which may support parallel decryption, and counter mode with CBC-MAC(CCM) and Galois/counter (GCM), with the authentication part not being parallelizable. The output feedback (OFB) portion of the AES algorithm would remain sequential.

In general, cryptographic primitives may be classified into parallelizable functions, partially parallelizable functions, and sequential functions. Examples of parallelizable functions include, but are not limited to, symmetric cryptography with parallelizable modes, parallelizable message authentication code (PMAC), and a primality test for asymmetric cryptography. Examples of partially parallelizable functions include, but are not limited to, symmetric cryptography with partial parallelizable modes, and special instructions, such as streaming single instruction, multiple data extensions (SSE) for hash functions. Examples of sequential functions include, but are not limited to, most hash functions and asymmetric cryptography. In regard to the sequential functions, using a cryptographic processing device, such as an ICA or a CCP, for performing these functions may help to reduce the load on the associated CPU.

Examples of functions that may be performed by the cryptographic processing device include, but are not limited to, the following. It is noted that a cryptographic processing device (either an ICA or a CCP) is configured to implement a single cryptographic algorithm. If multiple cryptographic algorithms were implemented in a single system, then multiple cryptographic processing devices would be required.

In an AES engine, the cryptographic processing device may be configured to include multiple engines and perform pipeline processing, which in some implementations, may result in a 8-10× performance improvement.

In a secure hash algorithm (SHA) engine, the cryptographic processing device may be configured to perform SHA1, SHA-256, HMACSHA1, HMACSHA-256, SHA 384 and 512 (for SHA and hash-based message authentication code HMAC), and SHA-3.

In a RSA engine, the cryptographic processing device may be configured to perform up to 4096-bit modular exponentiation, key generation, and primality checking.

In an elliptic curve cryptography (ECC) engine, the cryptographic processing device may be configured to perform an elliptic curve digital signature algorithm (ECDSA) up to 256-bit signature generation and verification, elliptic curve Diffie-Hellman (ECDH) up to a 256-bit key deployment, key generation, 384-bit and above support for ECC, and primality checking.

In connection with key management support, the cryptographic processing device may be configured to provide chip-unique secret or private keys that are local to the cryptographic processing device, and to provide other generated secret or private keys.

In connection with side channel attack (SCA) countermeasures, the cryptographic processing device may be configured to perform AES, RSA, and ECC algorithms; generate noise and random delays; strive for a constant execution time; and perform data independent execution.

In addition to the preceding, the cryptographic processing device may also be configured to perform as a hardware random number generator, to support multiple data streams, to support early termination of the cryptographic algorithm, and to access direct memory access (DMA)-based input/output data with full coherency support.

The cryptographic processing device may be used to provide a trusted execution environment, a hardware rooted secure boot, a trusted platform module (TPM), and general cryptographic acceleration. The cryptographic processing device may be implemented to enable solutions such as mobile payment, anti-theft, identity management, data protection, anti-malware, and content protection.

It should be understood that many variations are possible based on the disclosure herein. Although features and elements are described above in particular combinations, each feature or element may be used alone without the other features and elements or in various combinations with or without other features and elements.

The methods provided may be implemented in a general purpose computer, a processor, or a processor core. Suitable processors include, by way of example, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. Such processors may be manufactured by configuring a manufacturing process using the results of processed hardware description language (HDL) instructions and other intermediary data including netlists (such instructions capable of being stored on a computer readable media). The results of such processing may be maskworks that are then used in a semiconductor manufacturing process to manufacture a processor which implements aspects of the embodiments.

The methods or flow charts provided herein may be implemented in a computer program, software, or firmware incorporated in a non-transitory computer-readable storage medium for execution by a general purpose computer or a processor. Examples of non-transitory computer-readable storage mediums include a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs).

What is claimed is:
1. A method for accelerating cryptographic processing of a cryptographic algorithm, comprising:
breaking the cryptographic algorithm into a plurality of cryptographic primitives;
determining for each of the cryptographic primitives if each cryptographic primitive is capable of being executed in parallel;
executing the cryptographic primitive in parallel if the cryptographic primitive is fully capable of being executed in parallel;
executing a part of the cryptographic primitive in parallel that if the cryptographic primitive is partially capable of being executed in parallel;
sequentially executing the cryptographic primitive if the cryptographic primitive is not capable of being executed in parallel; and
distributing processing of the cryptographic primitive fully capable of being executed in parallel or the partially-capable of being executed in parallel cryptographic primitive to one or more devices capable of parallel execution of the cryptographic primitive.

2. The method according to claim 1, wherein the devices capable of parallel execution of the cryptographic primitive include at least one of: a graphics processing unit or a cryptographic processing device.

3. The method according to claim 2, wherein the cryptographic processing device includes an integrated cryptographic processor or a cryptographic co-processor.

4. The method according to claim 2, wherein the cryptographic processing device includes one or more cryptographic engines, each cryptographic engine being specific to a particular cryptographic algorithm.

5. The method according to claim 1, wherein the cryptographic primitive executed sequentially is executed on a central processing unit core.

6. The method according to claim 1, wherein the determining if a component is capable of being executed in parallel includes determining available hardware.

7. The method according to claim 6, wherein the determining available hardware includes determining the available hardware at runtime.

8. The method according to claim 1, wherein cryptographic primitives that are capable of being executed in parallel include parallelizable message authentication codes (PMAC); and wherein cryptographic primitives that are partially capable of being executed in parallel include multiple data extensions (SSE) for hash functions.

9. A system for accelerating cryptographic processing, comprising:
one or more devices capable of parallel execution of cryptographic primitives of a cryptographic algorithm; and
a central processing unit core, configured to:
break the cryptographic algorithm into a plurality of cryptographic primitives;
determine for each of the cryptographic primitives if each cryptographic primitive is capable of being executed in parallel;
execute the cryptographic primitive in parallel if the cryptographic primitive is fully capable of being executed in parallel;
execute part of the cryptographic primitive in parallel if the cryptographic primitive is partially capable of being executed in parallel;
sequentially execute the cryptographic primitive if the cryptographic primitive is not capable of being executed in parallel; and
distribute processing of the cryptographic primitive fully capable of being executed in parallel or the partially-capable of being executed in parallel cryptographic primitive to one or more devices capable of parallel execution of the cryptographic primitive.

10. The system according to claim 9, wherein the devices capable of parallel execution of the cryptographic primitives include at least one of: a graphics processing unit or a cryptographic processing device.

11. The system according to claim 10, wherein the cryptographic processing device includes an integrated cryptographic processor or a cryptographic co-processor.

12. The system according to claim 10, wherein the cryptographic processing device includes one or more cryptographic engines, each cryptographic engine being specific to a particular cryptographic algorithm.

13. The system according to claim 9, wherein the central processing unit core is further configured to execute the cryptographic primitives that are executed sequentially.

14. The system according to claim 9, wherein the central processing unit and the one or more devices capable of parallel execution are located on a single die.

15. The system according to claim 9, wherein the central processing unit core is further configured to:
determine if the plurality of cryptographic primitives is capable of being executed in parallel depending on available hardware.

16. The system according to claim 15, wherein the central processing unit core is further configured to:
determine the available hardware at runtime.

17. The system according to claim 9, wherein cryptographic primitives that are capable of being executed in parallel include parallelizable message authentication codes (PMAC); and
wherein cryptographic primitives that are partially capable of being executed in parallel include multiple data extensions (SSE) for hash functions.

18. A non-transitory computer-readable storage medium storing a set of instructions for execution by a general purpose computer to accelerate cryptographic processing of a cryptographic algorithm, the set of instructions comprising:
a breaking code segment for breaking the cryptographic algorithm into a plurality of cryptographic primitives;
a determining code segment for determining for each of the cryptographic primitives if each cryptographic primitive is capable of being executed in parallel;
a first executing code segment for executing the cryptographic primitive in parallel if the cryptographic primitive is fully capable of being executed in parallel;
a second executing code segment for executing a part of the cryptographic primitive in parallel if the cryptographic primitive is partially capable of being executed in parallel;
a sequentially executing code segment for sequentially executing the cryptographic primitive if the cryptographic primitive is not capable of being executed in parallel; and
a distributing code segment for distributing processing of the cryptographic primitive fully capable of being executed in parallel or the partially capable of being executed in parallel component to one or more devices capable of parallel execution of the cryptographic primitive.

19. The non-transitory computer-readable storage medium according to claim 18, wherein the instructions are hardware description language (HDL) instructions used for manufacturing of a physical device.

20. The non-transitory computer-readable storage medium according to claim 18, wherein the determining code segment includes
determining available hardware.

21. The non-transitory computer-readable storage medium according to claim 20, wherein the determining code segment includes:
determining the available hardware at runtime.

22. The non-transitory computer-readable storage medium according to claim 18, wherein cryptographic primitives that are capable of being executed in parallel include parallelizable message authentication codes (PMAC); and
wherein cryptographic primitives that are partially capable of being executed in parallel include multiple data extensions (SSE) for hash functions.

* * * * *